June 19, 1945.   S. D. POLSEN ET AL   2,378,430
DISPENSING APPARATUS
Filed April 9, 1942   3 Sheets-Sheet 1
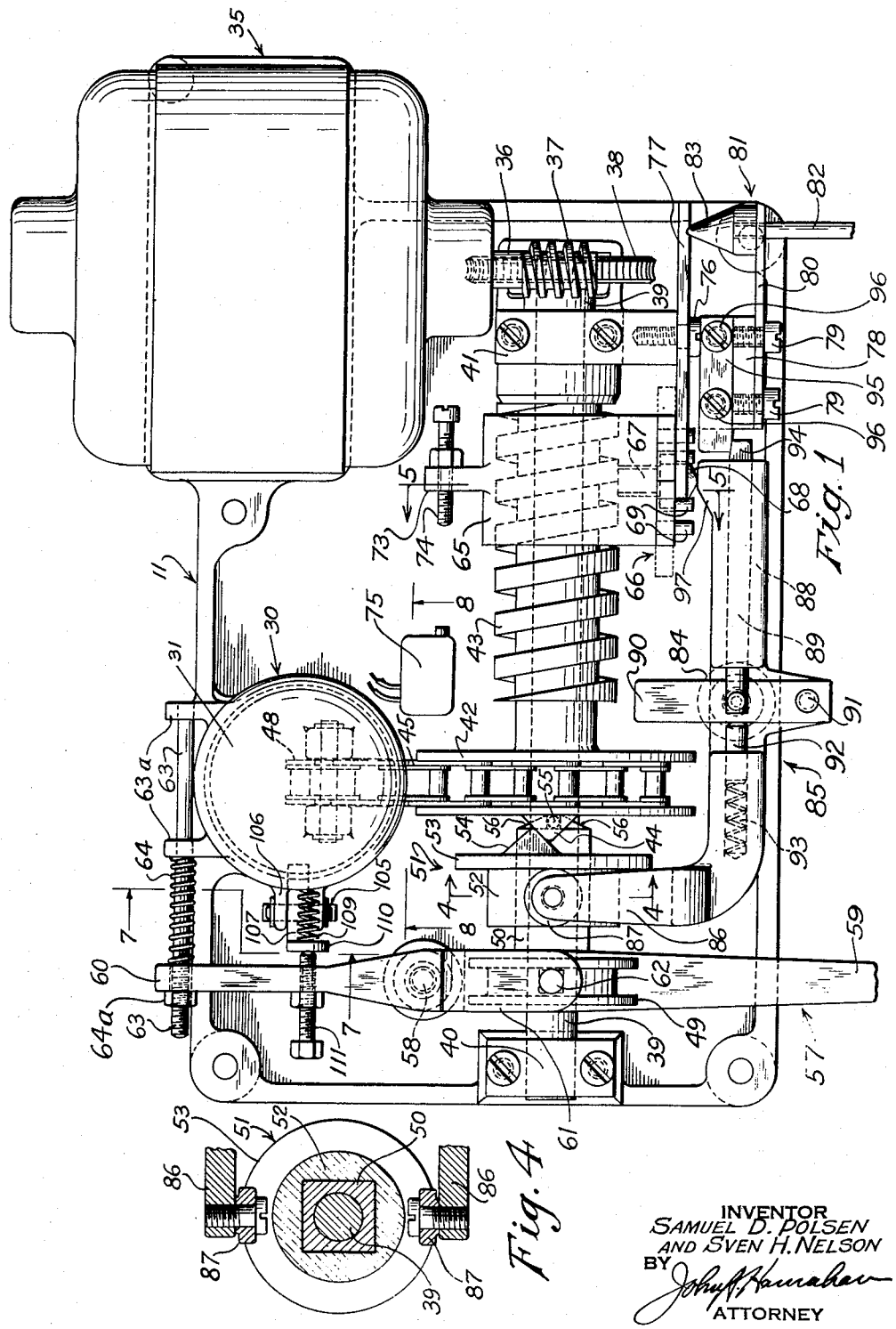
INVENTOR
SAMUEL D. POLSEN
AND SVEN H. NELSON
BY
ATTORNEY

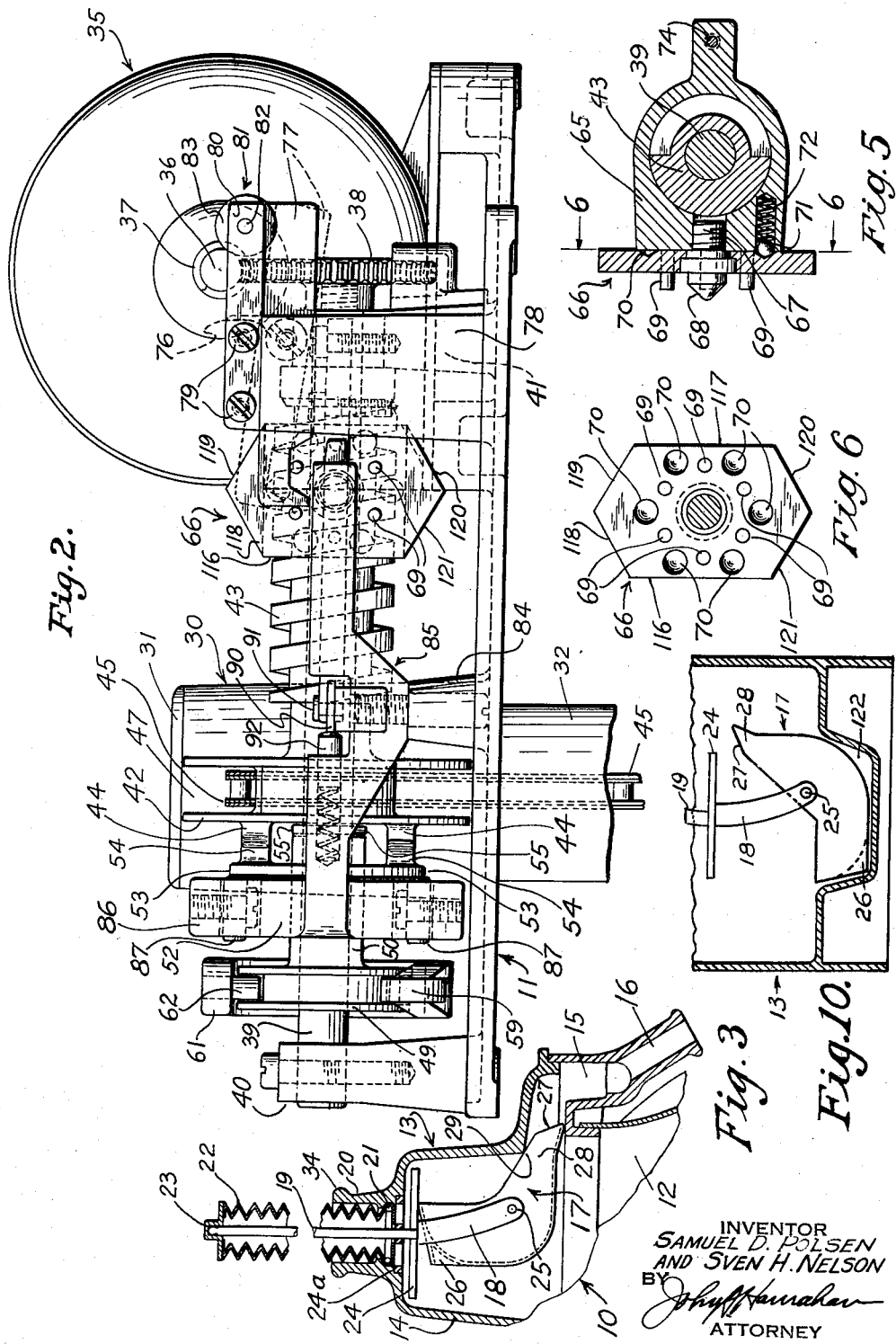

June 19, 1945.   S. D. POLSEN ET AL   2,378,430
DISPENSING APPARATUS
Filed April 9, 1942   3 Sheets-Sheet 3
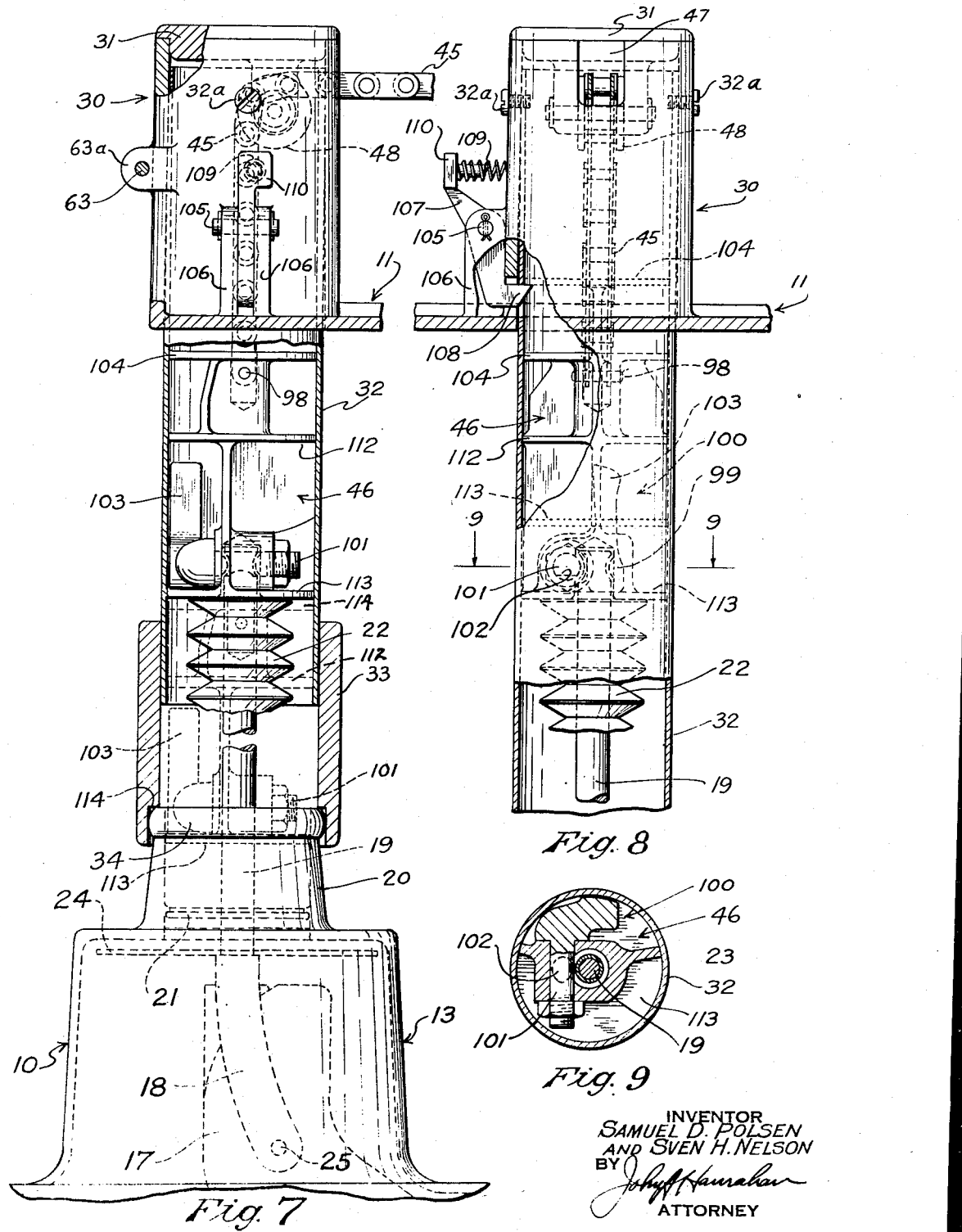
INVENTOR
SAMUEL D. POLSEN
AND SVEN H. NELSON
BY
ATTORNEY Patented June 19, 1945

2,378,430

UNITED STATES PATENT OFFICE 2,378,430

DISPENSING APPARATUS

Samuel D. Polsen and Sven Herbert Nelson, Bridgeport, Conn., assignors of one-fourth to Blanche H. Polsen and one-fourth to Mildred P. Nelson, both of Bridgeport, Conn.

Application April 9, 1942, Serial No. 438,232

33 Claims. (Cl. 222—52)

This invention relates to new and useful improvements in dispensing or vending apparatus and has particular relation to an apparatus for dispensing or vending liquids which tend to stratify and which therefore require mixing in order that the liquid dispensed at each operation of the machine will be of uniform content.

Milk stratifies so that in any given container milk when left standing for a length of time will so arrange itself that all the cream is in the upper portion of the container and the contents of the lower portion thereof will be little more than water.

The present invention comprehends a liquid dispensing or vending apparatus in which the liquid to be dispensed may be automatically mixed as a step in each dispensing operation of the apparatus to the end that each such operation results in the dispensing of a liquid of uniform richness in the case of milk and the like and of uniform content in the case of any liquids which tend to stratify.

Another object of the invention is to provide an apparatus of the kind and for the purpose stated and to which the liquid or liquids to be dispensed may be supplied in sealed containers which for all practical purposes remain sealed during the dispensing of their contents whereby such contents is guarded against contamination or dilution.

Other objects and advantages will become apparent from a consideration of the following detailed description taken in connection with the accompany drawings wherein a statisfactory embodiment of the invention is shown. However, it is to be understood that the invention is not limited to the details disclosed but includes all such variations and modifications as fall within the spirit of the invention and the scope of the appended claims.

In the drawings—

Fig. 1 is a top plan view of the apparatus of the invention;

Fig. 2 is a front elevational view thereof; the connecting column being partly broken away and container being omitted;

Fig. 3 is a detail sectional view on a smaller scale and showing the dipper in dispensing position in the container;

Fig. 4 is a detail sectional view taken as along the plane of the line 4—4 of Fig. 1;

Fig. 5 is a detail sectional view taken as along the plane of the line 5—5 of Fig. 1;

Fig. 6 is a sectional view taken as along the plane of the line 6—6 of Fig. 5;

Fig. 7 is a sectional view taken as along the plane of the line 7—7 of Fig. 1;

Fig. 8 is a view at right angles to Fig. 7 and taken as along the plane of the line 8—8 of Fig. 1;

Fig. 9 is a sectional view taken as along the plane of the line 9—9 of Fig. 8, and Fig. 10 is a detail sectional view through the lower portion of the container with the dipper in its lowermost position.

Referring in detail to the drawings the apparatus as herein disclosed is adapted for the dispensing of milk from a container a portion only of which is shown and generally designated 10. The operating mechanism of the invention is for the most part mounted on a base or plate 11 disposed above the container 10 and suitably supported. In actual use the container and the operating mechanism mentioned are mounted in a refrigerating cabinet (not shown) of suitable design so that the contents of the container will be preserved against spoilage and so that the drinks served by the dispenser will be cold and palatable.

Container 10 may comprise a body 12 open at its upper end and a closure or head 13 for the body. Head 13 is hollow and includes a raised central portion 14 and annular or other channel or trough-like portion 15 and a discharge spout 16 into which said trough is arranged to drain. Closure 13 is sealed in any suitable manner (not herein shown) to the body 12 and within the body and closure is a dispensing dipper 17 carried by a bail 18 on the lower end of a rod 19.

Within a neck-line portion 20 of the closure a split spring ring 21 anchors one end of an extensible bellows-like structure 22 of paper or the like and comprising a seal. The upper or outer end of this seal is closed as at 23 and disposed over the upper or outer end of the rod 19. A spider 24a also in the closure comprises a guide for the rod when the same is moving vertically to raise and lower the dipper 17. The container 10 is delivered to the store keeper or the like with the dipper and its rod in the container and with the seal 22 in place over the rod all as shown. Thus it will be understood that the container is sterilized and then filled and then sealed all at the milk station or the like loading place and is not opened by the store keeper or other person at the dispensing station.

Here however, attention is called to a plate 24 on the rod 19 immediately above or outwardly of the dipper, to the fact that the bail 18 is pivoted to the dipper at 25 and to the fact that the dipper has a socket or hollow place 26 in its under or lower side adjacent its rear end. Further it is noted that the dipper 17 includes inclined edge portions 27 along its pouring portion 28 and that such inclined edges are brought into engagement with a corner portion 29 of the closure 13 to cause tilting of the dipper to pouring position as the dipper is moved into the hollow central portion 14 of the closure.

At the upper side of the base 11 and cast integral therewith or otherwise suitably secured thereto is a tubular housing 30 opening at its lower end through the said base and closed at its upper end as by the plug 31. A tube 32, of a length stopping short of the container 10 has its upper end portion secured in the housing 30 as by screws 32a. About the lower end portion of the tube 15 is a sleeve 33 as shown in Fig. 7 this sleeve is adapted to receive the bead 34 at the upper end of neck 20.

Mounted on the base 11 is an electric motor 35 on the shaft 36 of which is fixed a worm 37 meshing with a worm gear 38 fixed to a rather long shaft 39 supported at the upper side of the plate in bearings 40 and 41. Freely mounted on shaft 39 is a structure including a reel and clutch element 42 and a worm 43. As will later more clearly appear the reel 42 comprises a movable operating means, specifically, a rotatable operating means, used for operating the dipper 17. The reel and worm may be integral or secured together but they turn as a unit and the reel at its side opposite that at which the worm is located is provided with driving lugs 44 comprising clutch means as will appear.

A chain 45 or other flexible connecting means has one end connected with the hub portion of the operating means or reel 42 and has its other end passing through the housing 30 and into the tube 32 and therein has such end secured to a coupling 46 later to be described in detail. Chain 45 passes substantially horizontally from the operating means or reel 42 through an opening 47 in the side wall of the housing 30 and within the latter passes over a guide pulley or roller 48 and then downwardly through the housing.

On the shaft 39 adjacent the bearing 40 is a shiftable pulley-like means 49 having a sleeve-like extension 50 integral therewith or secured thereto. The means 49 and its extension 50 are slidable on the shaft 39 and said extension is externally angular being shown as square in transverse section (see Fig. 4). Mounted on extension 50 to turn therewith but slidable along such extension is a clutch element 51 including a hub portion 52 and a plate portion 53 the latter carrying lugs 54 corresponding with and adapted for cooperation with the clutch means comprising the lugs 44 whereby the operating means or reel 42 may be driven from the element 51. Extending radially through the shaft 39 is a pin 55 and on the forward end of the extension 50 are a pair of lugs 56. When the extension and the means 49 have been shifted to have the lugs 56 engaged by the extending end portions 55 the said means and extension are driven by the shaft 39 if the motor 35 is operating.

Clearly when the extension 50 is rotating the clutch element 51 is rotating owing to the fact that the latter is on the square extension. Therefore if the clutch element 51 is so positioned that its lugs 54 are in position to engage the lugs 44 on the operating means or reel 42 the latter will be rotated to wind the chain or other flexible means 45 onto the reel. Thus reel 42 is the operating means directly concerned with the elevating of the dipper as by winding up of the chain 45.

When the lugs 54 are moved out of position in a direction away from the lugs 44 or when the extension 50 is moved to carry its lugs 56 away from the pins 55 the reel 42 will not be driven by the motor although the latter may be operating and driving the shaft 39.

A shifter, generally designated 57, is provided for moving the pulley-like means 49 and its sleeve-like extension 50 longitudinally of the shaft 39. The shifter comprises a bar pivoted intermediate its ends at 58 to provide an operating part or handle 59 extending forwardly of the base 11 and a rear tail-like portion 60. Forwardly of the pivot 58 an extension 61 of the shifter is carried up over the means 49 and at the upper side thereof is provided with a depending pin 62 entering between the flanges of the said means 49. With this construction as the shifter is rocked on pivot 58 the means 49 and its sleeve-like extension 50 are moved on the shaft 39 to carry the lugs 56 into or out of the path of the extending ends of the pin 55.

A guide rod 63 supported by lugs 63a on the housing 30 passes through the tail end portion 60 of the shifter and the latter bears against a coil spring 64 disposed about the rod. This spring constantly tends to rock the shifter about the pivot 58 in a direction to dispose the lugs 56 in the path of movement of the projecting ends of the pin 55. A nut 64a on the threaded portion of rod 63 may be adjusted to vary the pressure on spring 64. The handle-like end 59 of the shifter may be manually or automatically controlled, as by coin operated means, as desired and depending on the particular place of installation of the apparatus.

A nut 65 is mounted on the screw 43 to be fed forwardly and rearwardly therealong as the screw is turned in one direction or the other. On one side of the nut 65 a plate 66 is pivotally mounted as by a screw 67 having a bevelled or tapered head 68 exposed at the outer side of the plate to function as a cam as will appear. Plate 66 carries a plurality of pins 69 projecting at its forward side and in its rear side it has a series of small sockets or depressions 70, there being a corresponding number of the pins 69 and sockets 70. A ball or rounded projection 71 is carried by the nut 65 and a coil spring 72 constantly tends to move said ball outwardly of the nut so that when one of the depressions or sockets 70 comes opposite said ball it is snapped into such socket or depression.

An extension lug 73 on the nut 65 carries an adjustable screw 74 adapted to engage and trip a switch 75 as will appear. A screw 76 pivots a tripping lever or member 77 on the shaft bearing 41 and such tripping member serves to move the plate 66 at the proper times during operation of the machine. Mounted on a base extension 78 by a pair of screws 79 is a bracket 80 supporting a latching means 81 including a stem 82 and a cone-shaped or tapered head 83. When this means 81 is pushed inwardly it engages the tripping lever 77 and rocks it in a direction to carry its forward pin engaging end upwardly to an inoperative position above the pins 69 of plate 66 as shown by the dotted lines in Fig. 2. When the head 83 is in the position of Fig. 1 tripping lever 77 is horizontally disposed as in the full lines of Fig. 2.

Pivotally mounted intermediate its ends on a lug 84 of the base 11 is a holding means comprising a member 85 including an angularly disposed bifurcated end portion 86 the arms of which are above and below the hub-like portion 52 of the member 51 and carry rollers 87 normally bearing against the flange portion 53 of said member 51. Extending through a portion 88 of the member 85 is a latch bolt 89 pivoted at one end to a short operating lever 90 in turn pivoted at its outer end as by a means 91.

A plunger 92 is normally held projected by a coil spring 93 and bears against the lever 90 whereby the latter normally occupies a position maintaining the free end portion 94 of the latch bolt 89 in projected position. Screws 96 secure a keeper 95 in position on the upper side of the base extension 78 and the member portion 88 has a cam-like or raised portion 97 on its inner side. As will later appear in more detail the keeper 95 is for cooperation with the exposed end portion 94 of the latch bolt 89 and the cam portion 97 cooperates with the head 68 of the screw 67.

The chain 45 or similar flexible connecting means may be connected with the coupling 46 by any desired means although here the connection is made by a pin 98. In its lower end the coupling 46 has a socket 99 receiving the upper end of the rod 19 and the portion 23 of the seal 22 which is disposed over such end of the rod. It is noted that the upper or outer end of rod 19 is annularly grooved and a securing means generally designated 100 includes a pin-like part 101 provided with a flat side 102. Part 101 is mounted for turning movement about its longitudinal axis and for its manipulation a lever 103 is secured to one of its ends. Lever 103 is moved to rock the part 101 into a position with its flat side 102 disposed toward the socket 99 and then the rod and cover 23 may be entered into the lower end of the socket. Thereafter the lever is rocked to turn the part 101 into position with its flat side 102 remote from the socket 99 and with a portion of a rounded side entering such socket in a manner to crush a portion of the paper 23 into the annular groove in the end portion of the rod 19 and to partly enter into such groove of the rod whereby to lock the upper or outer end of the same to the coupling.

Coupling 46 includes a series of plate like portions centering it in the tube 32 the upper of such portions, designated 104, having an additional function as will appear. A pin 105 mounted by a pair of spaced lugs 106 on the outer side of housing 30 pivotally mounts a dog 107 having a tooth 108 normally extending into the housing and the upper end of the tube 32 through openings provided for that purpose. The dog 107 is normally held in the described position by a spring 109 bearing against housing 30 and the dog as shown. It is noted that the upper end portion 110 of the dog is located in the plane of movement of the tail-like portion 60 of the shifter 57 and that such portion 60 carries an adjustable screw 111 for engagement with portion 110 at predetermined times.

When the mechanism is to be put into use a filled container 10 is placed below the lower end of the tube 32 which as shown in Fig. 7 is of such length with relation to the base 11 and the top of the container as to stop short of the bead 34 about the upper end of the closure neck 20. At this time the container is sealed and the dipper 17 is at the bottom of the container and the rod 19 has its upper end in the neck portion of the closure 13 and such end of the rod is enclosed by the seal or bellows 22.

Now the flexible means 45 is unwound from the operating means or reel 42 and when fully unwound the lower portion of the coupling 46 is below the lower end of the tube 32 and partly within the neck of the container as shown by the dotted lines in Fig. 7. There it will be noted that the socket 99 is about the upper end portion of the rod 19 and the portion 23 of the seal. At this time the key 103 is exposed below the lower end of tube 32 as the sleeve 33 is raised and the key may be swung to a substantially horizontal position with its cut-out side 102 facing the socket 99 so that the rod and the cover 23 may freely enter the socket.

Then the key is swung up to a substantially vertical position as shown and a portion of part 101 enters the groove in the rod 19 and locks the latter to the coupling as previously explained. Attention is called to the fact that during this time the upper flanges 104 and 112 of the coupling are within the tube 32 so that the coupling is kept in proper alignment and it will be clear that when the entire coupling is within the tube the three flanges 104, 112 and 113 serve to keep the coupling aligned and against becoming tilted and wedged in the tube.

After the dipper rod 19 is secured to the coupling 46 as described the sleeve 33, which up until this time has been in an elevated out-of-the-way position, is lowered into the position of Fig. 7 with its shoulder 114 resting on the upper end of the neck of the container closure. This sleeve 33 keeps the container and the tube aligned and further serves to protect the paper or other disposal seal or bellows 22 in its portion that is exposed between the container and the lower end of the tube 32 during use of the machine. Plate 66 is movable with the nut 65 and such plate includes edges 116 and 117 spaced a shorter distance from the pivot screw 67 than are the edges 118, 119, 120 and 121 of the plate.

At the start of a cycle of operation of the machine when the same has been supplied with a fresh container 10 the dipper 17 is at the bottom of the container, the connector 45 is substantially unwound from the operating means or reel 42, the coupling 46 is in the dotted line position of Fig. 7, the nut 65 is in the retracted position shown in Figs. 1 and 2 and one of the edges 116 and 117 has been moved from the lever 90 and one of the edges 118, 119, 120 and 121 is facing said lever 90. For our present purpose it will be assumed that plate edge 118 is toward the lever 90. Member 51 is disposed with its lugs 54 in overlapping relation with the lugs 44 of the operating means or reel 42 and shifter 57 is being held in a position maintaining the lugs 56 of its sleeve 50 out of the path of movement of the ends of the pin 55.

To start the machine into operation the handle 59 is released either manually or automatically as by a coin controlled means or the like. Then the spring 64 and 109 move the shifter 57 about pivot 58 in a direction to move means 49 and sleeve 50 toward the reel 42 and have the lugs 56 located in the path of movement of the exposed ends of the pin 55. Shaft 39 is being driven at this time by the motor 35 and through the pin 55 and sleeve 50 drives the clutch element 51 which as above stated has its lugs 54 in overlapping relation with the lugs 44 on the operating means or reel.

It will now be understood that release of the shifter 57 under the conditions described brings about driving of the reel 42 through the lugs 44 and 54 in a direction to wind the connector 45 about the reel and thereby raise the dipper 17 in the container. When the reel is thus driven the screw 43 is being driven (as it is integral with or rigidly attached to the reel), and feeds the nut 65 and plate 66 toward the reel with the plate edge 118 in a path intersected by the lever 90.

At this time screw 74 is being carried toward the switch 75 but before such screw engages the switch the plate edge 118 engages the lever 90. As the plate thus engages the lever the latter is moved on its pivot 91 against the resistance of the spring pressed plunger 92 and draws the latch bolt 89 inwardly to release its end portion 94 from the keeper plate 95. When this occurs the entire device or holding means 85 is rocked about its pivot 84 in a direction to carry the lock bolt 89 against the adjacent end of the keeper 95 and to carry the rollers 87 away from the disc 53 so the member 51 is no longer being held with its lugs 54 in overlapping driving relation with the lugs 44 on the operating means or reel 42.

As is best shown in Fig. 1 these lugs 54 and 44 are wedge shaped and a cam-like face of one engages a similar face of the other. Therefore when member 51 is released the lugs 44 act on the lugs 54 to cam the member 51 along the sleeve 50 in a direction away from the reel. The described movement results from the fact that when the lugs 54 are not held in driving relation with lugs 44 the weight of the dipper 17, coupling 46 and connector 45 acting on the operating means or reel serve to rotate the latter in a direction reverse to that in which it was rotated by the motor. Reverse rotation of the operating means or reel takes place while the connector 45 is being unwound therefrom and the dipper is dropping in the container 10.

This reverse rotation of the operating means or reel 42 results in a reverse rotation of the screw 43 and a reverse feed of the nut 65 until the latter is returned to its normal or retracted position. All during this time the motor 35 is operating as the screw 74 has not engaged the switch 75 although that is not important as reverse motion of nut 65 carries the screw away from the switch permitting it to close. As the nut 65 approaches the end of its return movement the cam face 68 of the screw 67 engages the cam portion 97 of the member 85 rocking the latter back to normal position and shifting the latch bolt end 94 out off the end of the keeper 95 so that the bolt is again projected to the position shown and is retaining the rollers 87 against the disc 53 and maintaining the member 51 with its lugs 54 in overlapping driving relation with the lugs 44 on the reel.

During all of the described operation the shifter 57 has not moved and the means 49 and sleeve 50 are being driven by the shaft 39 and through the sleeve 50 the member 51 is being rotated. Thus when member 87 brings the member 51 back into position with its lugs 54 in driving relation with the lugs 44 on the reel, the latter is immediately rotated again in a direction to wind the connector 45 thereon and raise the dipper in the container.

One change has however taken place in the relation of the parts between the first time the connector 45 was wound onto the operating means or reel 42 and the second time such operation is started. During return movement of the nut 65 on the screw 43 the pin 69 opposite edge 119 of plate 66 was engaged by the tripping means 77 and the plate was pivoted to a position with its edge 119 in the place previously occupied by its edge 118. This movement of the plate was accomplished against the tendency of the spring pressed ball 71 to keep the plate in fixed position, it being understood that the ball and the sockets 70 are only for the purpose of preventing casual movement of the plate 66 on its pivot 67.

As the connector 45 is for the second time being wound onto the operating means or reel 42 the nut 65 is fed along the screw 43 and this time the edge 119 of the plate 66 engages lever 90 and rocks means 85 to a released position with respect to clutch element 51. Such element is again cammed away from the operating means or reel 42 by action of lugs 44 on lugs 54 and the reel is again free. Therefore dipper 17 is again dropped into the contents of the container 10 as the weight of the dipper and associated parts causes reverse movement of the operating means or reel and during such movements of the parts nut 65 is returned to normal or retracted position.

During this second return movement of the nut 65 and plate 66 the trip 77 engaged the pin 69 opposite edge 117 of the plate and rotated the latter to a position with its edge 117 in the place occupied by the edge 116 in the drawings or in other words with its edge 117 toward the lever 90. Also during this second return movement of the nut cam face 68 of the screw 67 engaged the cam surface 97 of the member 85 rocking the latter back to normal position and again bring clutch element 51 into position with its lugs 54 overlapping the lugs 44 on the reel 42.

Thus at the end of the return movements of the parts they are again started in motion being driven by the motor as will now be clear. Means 45 is again wound onto the operating means or reel 42 and the dipper 17 is again raised in the container and the nut 65 is again fed on the screw 43 in the direction of the lever 90. However, this time, on the third upward trip of the dipper in the container, the short edge 117 of plate 66 is facing the lever 90 and the arrangement of the parts is such that as said edge engages said lever the screw 74 engages the switch 75 and opens the circuit of motor 35.

Plate edge 117 being closer to the pivot 67 of said plate it will be clear that on this third feeding movement of the nut along the screw 43 until the plate edge 117 engages the lever 90 the nut has been given greater movement than on the first two traverses of the screw 43. During this longer traverse of the nut the operating means or reel 42 was being rotated with the result that more of the flexible connector 45 has been wound onto the reel. The first two operations resulted only in the dipper being lifted or drawn up into the neck portion of the container body 12. However the extra winding of the connector 45 onto the reel in this third traverse of the nut on screw 43 results in the dipper being moved into the closure 13 as to the position of Figs. 3 and 7.

When this occurs the edges 27 of the dipper engage the corner 29 and as the upward movement of the dipper rod 19 continues such edges 27 being blocked against further upward movement the dipper rocks about the pivots 25 to the tilted position shown and empties its contents into the trough 15 for movement through the spout 16. Movement of the dipper to this discharge position results in the flange 104 of the coupling 46 being carried into the housing 30. As such flange moves into the housing it cams the foot 108 of the dog 107 out of the way and then the spring 109 snaps the dog back to normal position with the flange 104 (see dotted lines Fig. 8) at the upper side of the foot portion 108 of the dog. This locks the flange and thus the entire coupling in the upper position with the dipper 17 in discharge position.

At this time the motor has been stopped due to opening of switch 75 by screw 74 and the plate 66 acting on the lever 90 has caused withdrawal of locking bolt 89 from locking position and the member 85 has moved on its pivot 84 carrying rollers 87 away from flange 53 so that clutch member or element 51 is not being held in position with its lugs 54 overlapping the lugs 44 of the operating means or reel although the parts may be in such position. Now to again start the machine into operation shifter 57 is operated about its pivot 58 first in a direction to have screw 111 engage the portion 110 of the dog 107 and rock such dog about its pivot to withdraw foot 108 from below the flange 104 of the coupling 46.

The described movement of shifter 57 results in retraction of the member 49 and its sleeve 50 so that lugs 56 are moved out of the path of movement of the pin 55. Now all the mechanism is disconnected from the shaft 39 and therefore if the shifter 57 is purposely or otherwise held there can be no raising of the dipper in the container. Therefore holding of the handle when the shifter has moved is without results in so far as any attempt to obtain the contents of the container 10 are concerned. If holding of the handle as described did not prevent dispensing movement being imparted to the dipper it will be understood that maintaining of the dog 107 in inoperative position might result in a continuous operation of the machine.

The coupling 46 having been released from the dog 107 as above described the weight of the dipper and chain on the coupling draws the same downwardly with the results on the reel 42, screw 43 and the other parts as previously described. Return movement is imparted to the nut 65 and the screw 74 is carried away from the switch 75 and the latter closes again completing the circuit of motor 35. The dipper hits the contents of the container with a splash to mix such contents. It is noted that the dipper has the pocket 26 in its under side at its rear whereby as the dipper hits the contents of the container the dipper is rocked on pivots 25 to a discharge position in which it moves downwardly through the milk or the like in container 10.

As the nut 65 made the return movement when the dog 107 was moved from under flange 104 of the coupling 46 the trip 77 engaged the pin 69 opposite edge 129 of plate 66 whereby the latter was shifted to present edge 120 to the lever 90. At the same time cam face 68 of screw 67 engaged cam edge 97 of member 85 and rocked the latter back to a position with rollers 87 engaging disc 53 and maintaining lugs 44 in overlapping relation with lugs 44 on the reel.

Thus immediately the parts return to their normal or retracted positions the operating means or reel 42 starts to wind up the connector 45 and the dipper 17 starts an upward movement in the container. With plate edge 120 facing the lever 90 the latter will be engaged and rocked with the results above described, before the screw 74 will engage switch 75. It will be understood that the shifter 57 was used to rock the dog 107 against the tendency of its spring 109 whereby to release the coupling 46 and that thereafter the shifter is released so that its springs 109 and 64 moved it to have it in turn move the member 49 and its sleeve 50 into positions with the lugs 56 of said sleeve in the path of movement of the pin 55.

It is believed that the operation involving raising and dropping of the dipper and the forward and reverse movements of the nut on screw 43 will be understood. The operations which took place as the various edges 118, 119 and 117 of plate 66 were presented to the lever 90 are duplicated when the edges 120, 121 and 116 of said plate are presented in order to said lever.

When a new container is attached to the machine the dipper on the first operation of the machine makes three trips up through the contents of the container (the third trip ending in discharge of the dipper into the trough 15) and only two trips down through the contents of the container. This is due to the fact that in the first use of the mechanism following the attaching of a container thereto the dipper starts from the bottom of the container. During each cycle of the machine's operation thereafter the dipper makes three trips each way as the machine then starts its cycle of operation with the dipper at the top of the container being held there by the dog 107.

The up and down motions of the dipper are rather rapid and serve to thoroughly mix the contents of the container. As the dipper has been standing at the bottom of the container when the same is first attached to the machine the dipper will be filled with unmixed liquid as the milk will have stratified with practically all cream at the top of the container. On its initial upward stroke the dipper may remain filled with the unmixed liquid but on its initial and on every down stroke it takes a discharge position because of the pocket 26. Thus as the dipper moves downwardly in the container the contents of the container are washing or flushing through the dipper. Plate 24 functions as a dasher and therefore helps to mix the contents of the container.

The bellows-like seal 22 excludes all dust and the like from the container and also serves to maintain covered the rod 19 as it moves out of and into the container during dispensing operations. It will be understood that by changing the number of faces on the plate 66 the number of up and down strokes of the dipper for each dispensing operation may be varied.

When the device of the invention is used in a store the cone 87 may be pushed inwardly after a few operations of the machine during a busy period to rock the trip 77 to the dotted line position of Fig. 2 and hold it in such position. Now the plate 66 is not moved as the nut 65 returns to the right on the screw 43 and thus the same face 116 or 117 will move back toward the lever 90 but will not engage it until the dipper has been moved to tilted discharge position and thus the machine will discharge a dipper of milk or the like at each upward stroke so that there will not be so long a period between discharges of the milk. It will be understood that when the machine has been operating the milk is mixed and that mixing movements of the dipper for immediate successive discharges are not required.

Chain 45 is of such length that when the dipper reaches the bottom of the container, which preferably has a central sump 122 to receive the dipper, a portion of the chain remains wound on operating means or reel 42. Thus as the chain continues to unwind the dipper remains stationary and as the mechanism begins its reverse movement the dipper remains stationary until the excess chain is taken upon the reel. This short period when the dipper is stationary permits of the drain into the dipper of the last contents of the container.

Having thus set forth the nature of our invention, what we claim is:

1. In a dispensing apparatus, a container having a discharge spout, a dipper in said container, an operating means connected with said dipper and extending upwardly out of said container, an operating mechanism supported independent of said container and connected with the upper end portion of said means for raising the dipper in the container to discharge a dipper full of the contents of the container through said spout, and an expansible bellows-like seal about said means to expand as the means is moved upwardly out of the container and collapse as the means is moved into the container whereby the means is covered at all times to protect it from contamination.

2. In a liquid dispensing apparatus, a container, a dipper in the container, a means connected with the dipper, mechanism supported independent of the container and connected with the means for moving it outwardly of the container to move the dipper to a discharge position, and an expansible and collapsible seal about said means and having one end anchored within the container and sealing the same about the means and having its other end anchored at the outer end of the means whereby the means is covered as it is moved out of and into the container while moving the dipper to and from said discharge position.

3. In a liquid dispensing apparatus, a container, a dipper in the container, a means connected with the dipper, mechanism supported independent of the container and connected with the means for moving it outwardly of the container to move the dipper to a discharge position, and a bellows-like seal of disposable material about said means and having one end anchored within the container and sealing the same about the means and having its other end anchored at the outer end of the means whereby the means is covered as it is moved out of and into the container while moving the dipper to and from said discharge position.

4. In a liquid dispensing apparatus, a container, a dipper in said container, a flexible connector, a coupling securing one end of said connector to the dipper, a reel, means securing the other end of said connector to the reel, means to rotate said reel to wind the connector thereon and elevate the dipper in the container, means to render the second mentioned means inoperative after predetermined movement of the dipper thereby to permit of unwinding of the connector from the reel and lowering of the dipper in the container, and means then operative to render the second means again operative to wind the connector on the reel and elevate the dipper to discharge position.

5. In a liquid dispensing apparatus, a container, mechanism disposed above said container and supported independently thereof, a dipper in said container, said mechanism including an operating means, a connector secured at one end to said operating means, a coupling detachably securing the other end of said connector to the dipper, a tube supported with said mechanism and extending toward the container, said coupling movable in said tube and guided thereby, and said mechanism including means to move said operating means to lift said connector and raise the dipper to a discharge position.

6. In a liquid dispensing apparatus, a container, a mechanism disposed above said container and supported independently thereof, a dipper in said container, said mechanism including an operating means, a connector secured at one end to said operating means, a coupling detachably securing the other end of said connector to the dipper, a tube supported with said mechanism and extending toward the container, said coupling movable in said tube and guided thereby, said mechanism including means to move said operating means to lift said connector and raise the dipper to a discharge position, said tube stopping short of said container, said connector of a length to permit movement of the coupling to a position at least partly below the lower end of the tube to expose the coupling for manipulation to connect it to and disconnect it from said rod, a sleeve about the lower end of the tube and the upper end of the container and normally closing the space between them, and said sleeve shiftable to an out of the way position to permit of said manipulation of the coupling.

7. In a liquid dispensing apparatus, a container for the liquid, a dipper in the container, a flexible connector secured at one end to said dipper, a reel to which the other end of said connector is secured, power operated means to turn said reel in one direction to wind the connector thereon to move the dipper to a discharge position, and means to disconnect said power operated means from the reel when the dipper reaches said discharge position.

8. In a dispensing apparatus, a container including a body and a hollow head-like closure on said body, a dipper in said body, a rod pivotally connected with said dipper, a flexible connector secure at one end to said rod, a reel to which the other end of said connector is secured, power means to turn said reel to wind the connector thereon and raise said dipper into the head-like portion of the container, means in said head-like portion of the container in the path of movement of a portion of the dipper and which is engaged by said portion of the dipper and causes tilting of the latter to discharge position as the turning of the reel continues to wind the connector thereon, and means to then disconnect the power means from the reel.

9. In a liquid dispensing apparatus, a container, a dipper in the container, a shaft, means for rotating said shaft, an operating means freely turnable about said shaft, a connector secured at one end to said dipper and at its other end to said operating means, clutch means for driving said operating means from said shaft to raise the connector and move the dipper to a discharge position, and means then operable to release said operating means from the shaft.

10. In a liquid dispensing apparatus, a container, a dipper in the container, a shaft, an electric motor connected to drive said shaft, a reel freely turnable on said shaft, a flexible connector secured at one end to said dipper and at its other end to said reel, means for driving the reel from the shaft to wind up said connector and move the dipper to discharge position, means then operable to release the reel from the shaft, and other means then operable to open the circuit of the motor.

11. In a liquid dispensing apparatus, a container, a dipper in the container, a shaft, an electric motor connected to drive said shaft, a reel freely turnable on said shaft, a flexible connector secured at one end to said dipper and at its other end to said reel, means for driving the reel from the shaft to wind up said connector and move the dipper to discharge position, means then operable to release the reel from the shaft and open the circuit of the motor, and means to latch the dipper in such discharge position.

12. In a liquid dispensing apparatus, a container, a dipper in said container, a shaft, means driving said shaft, an operating means mounted for movement, a connector secured to said dipper and said operating means, a sleeve slidable on said shaft, driving means carried by said shaft, means for sliding said sleeve into and out of driven relation with said driving means, clutch means for imparting movement to said operating means, a clutch element on and rotatable with said sleeve but slidable thereon into and out of driving relation with the clutch means, means for holding said clutch element in driving relation with said clutch means for movement of the operating means in a direction to take up on the connector and thereby elevate the dipper to discharge position, and means then operable to shift said holding means to release the clutch element for movement from the clutch means to release the operating means.

13. The combination as in claim 12 including latch means for securing the parts with the dipper in an elevated position when said operating means is released.

14. The combination as in claim 12 including latch means for securing the parts with the dipper in an elevated position when the operating means is released, and said means for moving the sleeve including means to release said latch means when the machine is next in operation.

15. The combination as in claim 12 wherein said clutch means and clutch element include cooperating lugs having cam-like faces whereby as the holding means is released the weight of the dipper and connector causes reverse movement of the operating means and such reverse movement of the operating means and its clutch means causes camming of the clutch element along said sleeve to carry the lugs of the element out of driving relation with those of the operating means.

16. In a liquid dispensing apparatus, a container for the liquid, a dipper in the container, a flexible connector secured at one end to the dipper, a shaft, means on the shaft and over which said connector passes, a motor for rotating the shaft and through the latter said means to take up on said connector and elevate the dipper to discharge position, and means then operable to release said means from said shaft.

17. In a liquid dispensing apparatus, a container for the liquid, a dipper in the container, a connector secured at one end to the dipper, a shaft, means to which the other end of said connector is secured, means to establish a driving connection between the shaft and the first means whereby the latter may be moved to take up on the connector and raise the dipper to discharge position, and means then operable to disestablish the driving connection between the shaft and the first named means.

18. In a liquid dispensing apparatus, a container, a dipper in said container, a connector, a coupling securing one end of the connector to the dipper, an operating means, means securing the other end of the connector to said operating means, means to move said operating means; to raise the dipper in the container, means to render the moving means inoperative after predetermined movement of the dipper thereby to permit of reverse movement of the operating means under the weight of the dipper and associated parts to lower the dipper in the container, and means then operable to render the first mentioned means again operable to move the operating means a greater distance and raise the dipper to a discharge position.

19. In a liquid dispensing apparatus, a container, a dipper in said container, a shaft, means for driving said shaft, a reel mounted for turning movement on said shaft, a flexible connector secure at one end to said dipper and at its other end to said reel, a sleeve slidable on said shaft, driving means carried by said shaft, means for sliding said sleeve into and out of driven relation with said driving means, clutch means on said reel, a clutch element on and rotatable with said sleeve but slidable there along into and out of driving relation with the clutch means, means to move said sleeve to and from driven relation with said driving means, means for holding said clutch element in driving relation with said clutch means for movement of said reel in a direction to wind said connector thereon to elevate the dipper to a discharge position, and means then operable to shift said holding means to release the clutch element for movement from the clutch means to release the reel.

20. The combination as in claim 12 including means pivotally mounting said holding means, a feed screw turnable as said operating means is moved, a latch bolt maintaining said holding means in operative position, a nut on said feed screw and movable along the same in directions depending on the direction in which the screw is turned, means on said nut and movable therewith as the same is moved by said feed screw, and means on said latch bolt and disposed in the path of movement of said nut carried means whereby on predetermined movement of the nut in one direction said latch bolt is moved to a released position and said holding means is rocked on its pivotal mounting to its released position.

21. The combination as in claim 12 including means pivotally mounting said holding means, a feed screw turnable as said operating means is moved, a locking bolt maintaining said holding means in operative position, a nut on said feed screw and movable along the same in directions depending on the direction in which the screw is turned, means on said nut and movable therewith as the same is moved by said feed screw, means on said locking bolt and disposed in the path of movement of said nut carried means whereby on predetermined movement of the nut in one direction said locking bolt is moved to a released position and said holding means is rocked on its pivotal mounting to its released position, and means carried by said nut and operable to engage said holding means and rock it back to position maintaining the clutch member in operative relation to the clutch means on return movement of the nut along the screw.

22. The combination as in claim 12 including a feed screw turnable as said operating means is moved, a nut on said screw and movable along the same in directions depending on the direction in which the screw is turned, a multi-faced device movable with said nut and adapted to be indexed relative thereto, said device on each movement of the nut in one direction adapted to move said holding means to a released position with respect to said clutch member and on each movement in the opposite direction to return the holding means to holding relation with such member, the faces of said device differing from one another in that one of such faces permits of an excessive movement of the nut over that permitted by the other faces before the device moves the holding means to released position whereby the operating means is given its movement to raise the dipper to discharge position, and means for indexing said device on return movements of the nut whereby its faces are presented successively for imparting movement to the holding means.

23. The combination as in claim 12 including a feed screw turnable as said operating means is moved, a nut on said screw and movable along the same in directions depending on the direction in which the screw is turned, a multi-faced device movable with said nut and adapted to be indexed relative thereto, said device on each movement of the nut in one direction adapted to move said holding means to a released position with respect to said clutch member and on each movement in the opposite direction to return the holding means to holding relation with such member, the faces of said device differing from one another in that one of such faces permits of an excessive movement of the nut over that permitted by the other faces before the device moves the holding means to released position whereby the operating means is given its movement to raise the dipper to discharge position, means for indexing said device on return movements of the nut whereby its faces are presented successively for imparting movement to the holding means, said means driving said shaft comprising an electric motor, a switch in the circuit of said motor, and means on said nut and operable to open said switch to stop the motor on predetermined movement of the nut in one direction along the screw.

24. In a liquid dispensing apparatus, a container, mechanism disposed above said container and supported independently thereof, a dipper in said container, a rod connected with the dipper and extending in the direction of said mechanism, said mechanism including an operating means, a connector secured at one end to said operating means, a coupling detachably securing the other end of said connector to the upper end of said rod, and said means including means to move said operating means to lift said connector and raise the dipper through the contents of the container to a discharge position in the upper portion of the container.

25. In a liquid dispensing apparatus, a container having a discharge spout spaced from its bottom wall and having a sump in said wall, a dipper in said container and adapted to be received in said sump, means including a flexible connector for lowering and raising the dipper in the container to load the dipper with the contents of the container and raise said contents to said discharge spout, said means for raising the dipper including automatic means, said connector of greater length than required to lower the dipper into the sump whereby the initial action of said automatic means results only in taking up the excess of said connector without imparting upward movement to the dipper whereby when there is little contents in the container a time interval is provided to permit such contents to drain into the dipper when the latter is lowered into said sump, and a vertical rod connected at its lower end with said dipper and extending to the upper side of said container and there secured to said connector whereby the latter does not enter the container in any position of the dipper.

26. In a dispensing apparatus, a container having a discharge spout spaced from its bottom wall and having a sump in said wall, a dipper in said container and adapted to be received in said sump, means including a flexible connector for lowering and raising the dipper in the container to load the dipper with the contents of the container and raise said contents to said discharge spout, said means for raising the dipper comprising automatic means, and means providing for a delay in the raising of the dipper by said automatic means whereby when there is but little contents in the container a time interval of delay is provided between the lowering of the dipper into the sump and the raising of the dipper from the sump to permit the contents of the container to drain into the dipper when it is lowered into said sump.

27. In a liquid dispensing apparatus, a container, mechanism supported above said container, a dipper in the container, elongated means pivoted to the dipper and extending toward said mechanism, said mechanism including an operating means, a connector secured at one end to said operating means, a coupling detachably securing the other end of said connector to the upper end of said elongated means, a rigidly supported tube between the mechanism and container, said coupling movable in said tube and guided thereby, and means including means to move said operating means to lift said connector and raise the dipper to discharge position.

28. In a liquid dispensing apparatus, a container, a dipper in said container, a shaft, an electric motor connected to drive said shaft, a reel freely turnable on the shaft, a flexible connector connected at one end to the dipper and at its other end to said reel, means for rotating the reel from the shaft to wind up said connector and move the dipper to discharge position, means then operable to release the reel from said shaft, a feed screw rotatable as the reel is rotated, a nut on the feed screw and movable along the same in directions depending on the direction in which the screw is rotated, and means on said nut and operable to open the circuit of said motor on predetermined movement of the nut in one direction.

29. In a liquid dispensing apparatus, a container, a dipper in said container, and adapted to be moved by gravity to the bottom of the container, a latch means for securing the dipper in an upper discharged position in the container, means to operate said latch means to released position to permit the dipper to gravitate toward the bottom of the container, means then operable to move the dipper upwardly in the container but short of discharge position and then release it to gravitate toward the bottom of the container to mix the contents of the latter, said means at the end of the mixing of the contents of the container operable to move said dipper to discharge position, and means whereby said latch is effective to secure said dipper in discharge position when moved thereto.

30. In a liquid dispensing apparatus, a container, a dipper in said container and adapted to be moved by gravity to the bottom of the container, a latch means for securing the dipper in an upper discharged position in the container, means to operate said latch means to released position to permit the dipper to gravitate toward the bottom of the container, means then operable to cause upward and downward movement of the dipper in the container with such upward movement short of the discharge position of the dipper to mix the contents of the container, said means at the end of the mixing of the contents of the container operable to move said dipper to discharge position, and means whereby said latch is effective to secure said dipper in discharge position when moved thereto.

31. In a dispensing apparatus, a container, a dipper in said container, means passing through a wall of the container and connected with said dipper, a seal sealing the container about said means, a mechanism, a coupling detachably connecting said mechanism with said means without moving the latter and dipper from the container whereby the dipper of a filled container may be connected with the mechanism without unsealing the container, and said mechanism when coupled with said means operable to move the dipper through a cycle of operations including elevating the dipper to dispense a portion of such contents.

32. In a dispensing apparatus, a container, a dipper in said container, means passing through a wall of the container and connected with said dipper, a seal sealing the container about said means, a mechanism, a coupling detachably connecting said mechanism with said means without moving the latter and dipper from the container whereby the dipper of a filled container may be connected with the mechanism without unsealing the container, said mechanism when coupled with said means operable to move the dipper through a cycle of operations including elevating the dipper to dispense a portion of such contents, and means supporting said mechanism above and independent of said container whereby the latter may be readily removed and replaced with respect to said mechanism on detachment of said coupling.

33. In a liquid dispensing apparatus, a container, mechanism disposed above said container and supported independently thereof, a dipper in said container, a rod connected with the dipper and extending in the direction of said mechanism, said mechanism including an operating means, a connector secured at one end to said operating means, a coupling detachably securing the other end of said connector to the upper end of said rod, a tube supported by said mechanism and extending toward the container, said coupling movable in said tube and guided thereby, said mechanism including means to move said operating means to lift said connector and raise the dipper to a discharge position, and expansible and collapsible seal about said rod and anchored at one end in the upper portion of the container and at its other end about the upper end of said rod whereby as the latter is moved out of and into the container it is protected from dust and the like.

SVEN H. NELSON.
SAMUEL D. POLSEN.